United States Patent [19]

Freeman

[11] Patent Number: 4,808,429
[45] Date of Patent: Feb. 28, 1989

[54] ENCAPSULATION

[75] Inventor: Christopher P. Freeman, Bedford, England

[73] Assignee: Internationale Octrooi Maatschappij "Octropa" BV, Rotterdam, Netherlands

[21] Appl. No.: 82,993

[22] Filed: Aug. 7, 1987

Related U.S. Application Data

[63] Continuation of Ser. No. 717,146, Mar. 28, 1985, abandoned.

[30] Foreign Application Priority Data

Mar. 28, 1984 [GB] United Kingdom ................. 8407947

[51] Int. Cl.$^4$ ............................................... A23K 1/04
[52] U.S. Cl. ..................... 426/647; 426/98; 426/519; 426/520; 426/603; 426/807
[58] Field of Search ..................... 426/647, 602, 2, 98, 426/603, 807, 519, 520

[56] References Cited

U.S. PATENT DOCUMENTS

| | | | |
|---|---|---|---|
| 3,959,493 | 5/1976 | Baalsrud et al. | 426/2 |
| 3,968,261 | 7/1976 | Goodman | 426/98 |
| 4,007,284 | 2/1977 | Goryaev et al. | 426/98 |
| 4,073,960 | 2/1978 | Scott et al. | 426/807 |
| 4,138,505 | 2/1979 | Hart et al. | 426/98 |
| 4,216,234 | 8/1980 | Rawlings et al. | 426/98 |
| 4,217,370 | 8/1980 | Rawlings et al. | 426/98 |

*Primary Examiner*—R. B. Penland
*Attorney, Agent, or Firm*—Cushman, Darby & Cushman

[57] ABSTRACT

An encapsulated lipid material useful as an animal feedstuff ingredient is prepared by homogenizing natural slaughterhouse blood, essentially free from any anticoagulating agents with lipid material in the molten state containing by weight more than 20% free-fatty acids, allowing the resulting dispersion or emulsion to set to a firm gel (which will typically occur at a temperature below 50° C.) and drying the gelled product in equipment in which the gel experiences a tumbling action.

10 Claims, No Drawings

ENCAPSULATION

This is a (CIP) continuation of application Ser. No. 717,146, filed Mar. 28, 1985, which was abandoned upon the filling hereof.

The present invention relates to the encapsulation of lipid material within a protective proteinaceous matrix.

The usefulness of encapsulated protected lipid material is already well established. Encapsulated lipid can be prepared in dry free-flowing powdery or granular form, which can be handled easily and incorporated in animal feed formulations to provide enhanced lipid inclusion levels without associated processing difficulties. In the case of ruminant animals such as dairy cattle, the feeding of encapsulated lipid material is particularly advantageous because the lipid material is less likely to interfere with the normal rumen digestive action.

Several prior proposals have involved the encapsulation of lipid material within a denatured proteinaceous matrix. Chemical denaturation of the protein has been suggested, for example using formaldehyde. Such treatment leads to a very indigestible protein matrix which, in the ruminant animal inhibits release of the lipid material in the lower regions of the digestive system. The lipid is thus over-protected and its value as a feed ingredient is reduced, even through it does not interfere with the rumen function. We believe that it is better to rely on heat-denaturation of the protective proteinaceous matrix.

In U.S. Pat. No. 4,216,234 there is described a process which involves forming a dispersion or emulsion of globules of nutrient lipid within an aqueous albumin-containing medium, and thereafter forming a gel. The resulting gel is then dried to form a particulate nutrient composition. The process is especially applicable to the use of animal blood as the source of albumin. In order to prepare the gel, this U.S. patent specification teaches that the proteinaceous medium (e.g. blood) should be rendered strongly alkaline (pH 9.6–12.5) prior to the formation of the lipid dispersion or emulsion, and thereafter the dispersion or emulsion should be heated to a temperature within the range 40°–100° C. until a gel forms. We have found that the addition of alkali to natural blood to produce a pH in the range stated causes a gel to form very rapidly. Under such circumstances it is difficult, if not impossible, to prepare a good dispersion/emulsion of lipid material within the rapidly-gelling alkaline blood, and the resulting product when dried exhibits poor physical protection of the lipid material. An encapsulated lipid material manufactured according to the process described in this U.S. patent specification is thus liable to have rather variable quality. We have similarly noted that a poor degree of physical protection can result if gelling of the blood is initiated by using a strong mineral acid rather than an alkali. The addition of small quantities of mineral acids to blood results only in a very weak and ineffective gel, whereas the addition of higher amounts of mineral acids to the blood causes very rapid and uncontrollable gelatin similar to that caused when blood is rendered strongly alkaline.

The present invention provides a process for the preparation of an encapsulated lipid material involving the drying of a gelled dispersion or emulsion of lipid material in an aqueous suspension of functional protein, characterised in that the lipid material contains a proportion of free fatty acids sufficient to cause the dispersion or emulsion to set to a firm gel at a temperature well below the boiling point of the blood, preferably at a temperature of 50° C. or less.

By ensuring that the lipid material contains a proportion of free fatty acids, we have found that the mixture of lipid material and protein will set to a firm gel without the need for excessive heating to be applied, and yet the rate of gelatin is not so rapid that the gel is formed before the lipid droplets can be adequately dispersed within the protein matrix.

The aqueous suspension of functional protein can be derived from a variety of sources. For economic reasons sources that would otherwise be regarded as waste protein are preferred. Examples of suitable proteins are wheat protein, soya proteins, casein and fish proteins (eg "stick water"). However, the most preferred aqueous suspension of functional protein for use in the invention is natural blood. Blood is available in quantity from the slaughter of animals for food and other purposes. The functional protein content of the aqueous suspension is preferably at least 10%, and more preferably at least 12%, expressed on a dry weight basis. Natural slaughterhouse blood typically has a dry matter content of about 18% by weight, of which about 90% is protein. Irrespective of the source, the protein in the suspension should be "fresh", i.e. at least a substantial proportion of protein should be in a functional (undenatured) state. The protein suspension should be essentially free from any additives such as anticoagulating agents (e.g. EDTA), that would prevent the natural gelling of the protein.

The dispersion or emulsion of lipid material and protein should form a firm gel prior to dehydration. In this state the gel has a self-sustaining shape and is essentially non-pourable. During gel formation, encapsulation of lipid material within a protein matrix occurs.

Preparation of the dispersion or emulsion can be achieved by homogenising the protein suspension and the lipid material together. Care should be taken not to continue the homogenisation process for too long, otherwise the desired gel may form and then be disrupted by continued homogenisation. A typical homogenisation time during large-scale manufacture is about 30 minutes.

The desired gel forms spontaneously if the dispersion or emulsion contains a sufficient proportion of free fatty acids. In general this gel formation will take place at temperatures in the range of 40°–50° C., but in some instances it will occur below 40° C. The minimum level of free fatty acids necessary to form a firm gel will vary depending on the materials used and the equipment used to prepare the dispersion or emulsion. In general, however, more than 20% and more usually at least 30% by weight of the lipid material should be free fatty acids. Preferably, this level is at least 45% and more preferably at least 50% by weight of the lipid material. If desired, the lipid material can be a so-called "acid oil" which will typically contain 60% or more of free-fatty acids. Blends of lipid materials can be used and free-fatty acids can be incorporated in such blends. The lipid material can be any oil or fat, for example tallow, soya oil, corn oil and palm oil. If the lipid material is normally solid at ambient temperature, it should be heated until molten prior to mixture with the aqueous suspension of functional protein in order that a satisfactory dispersion or emulsion can be formed. If desired, the free fatty acids can be incorporated in the form of acid oil. Palm fatty acid oil and palm fatty acid distillate are very suitable commercial sources of free-fatty acids for use in accordance with this invention. Fish acid oil is also suitable.

Following the formation of a firm gel, the encapsulated lipid material can be dried using a variety of types of equipment. Drying equipment in which the gel experiences a tumbling action is preferred, and drying equipment of the "Rotadisc" type (manufactured by Stord-Bartz) is very suitable. The drying conditions, especially temperature, should be such that the protein matrix is retained but the microbial degradability of the protein is reduced.

The encapsulated lipid material of the invention can be used as a carrier for lipid-soluble feed additives, such as vitamines A, D and E, and antibiotics such as avoparcin. These should be dissolved in the lipid material prior to the formation of the dispersion or emulsification of the lipid material in the protein suspension.

The encapsulated lipid material of the invention can be used as a nutrient material in its own right, or can be blended with other nutrient materials to provide a compound animal feedstaff. The physical preparations of the compound feed can be achieved using any conventional equipment. The nature of the other nutrient materials that can be mixed with the encapsulated lipid material is not critical to the invention, and these can be nutritionally appropriate combination of the conventional ingredients used in feed manufacture, e.g. grains, either whole or milled, such as barley, wheat, sorghum, maize, rice oats and rye; cereal by-products, such as wheat feed (germ), maize dark grains, barley dark grains, brewers grains, malt culms (sprouting tips from the brewing industry), maize germ, grain screenings and oat feed; oil seed residues derived from seeds such as rape, soya, groundnut, palm kernel, sun flower, linseed, shea nut, illipe and cotton-seed; oils and fats of vegetable or animal origin; any of the miscellaneous products or plant or animal origin conventionally used in feedstuff manufacture, such as field beans, peas, tapioca, beet pulp, potato pulp, straw guar, molasses, single-cell protein, meat and bone meal, fish meal, blood meal and dried poultry manure; non-protein nitrogen sources such as urea and urea derivative; and vitamins and mineral additives.

The encapsulated lipid material of the invention is especially suitable for inclusion in the diet of dairy cattle to enhance their milk production. More generally, the encapsulated lipid material can be used to incorporate high lipid levels in pelleted animal feeds without incurring the processing difficulties normally associated with high lipid diets. The encapsulated lipid material can thus be used very advantageously in fish feeds, for example. The encapsulated lipid material is also very suitable for inclusion in the diet of fur-bearing animals, such as mink, reared in captivity.

A preferred embodiment of the invention is now described by way of example only.

EXAMPLE 1

Whole animal blood, obtained as abattoir waste, was heated in a steam jacketed tank to a temperature of 40°–45° C. and then homogenised with lipid (previously heated to 75° C.) using a Silverson homogeniser fitted with a general disintegration head. The final composition of the emulsion was 13% protein, 65% water and 22% lipid, by weight. The lipid material was commercially-available palm acid oil, containing approximately 90% free fatty acids. The homogenisation was conducted for approximately 30 minutes and resulted in an emulsion containing fat droplets in the range 10–15 microns. This emulsion was allowed to gel at ambient temperature. When a satisfactory firm gel had formed, this was transferred to a "Rotadisc" dryer (Stord-Bartz AS, Bergen, Norway) in which it was dried between rotating disks, individually heated by steam at a pressure of 2–3 bars (134°–135° C.) and conveyed through the length of the dryer by vanes or paddles attached to the disks. The product was dried to a moisture content of about 3–5% by weight, and emerged from the dryer in the form of small granules.

The final product was sterile and, when incubated in polyester monofilament bags of 45 microns mesh in the rumen of a dairy cow the dry matter loss of the product after 6 hours was 5–15%. The product therefore had a degree of protection of about 85–95%. The final product had an approximate composition of 60% fat, 34% protein, 2% ash and 4% moisture, and in this form could be directly incorporated into the diet of a dairy cow.

EXAMPLE 2

A series of experiments were performed with several different lipid materials to determine the minimum proportion of free-fatty acids necessary to cause satisfactory gelling of the blood-lipid emulsion, leading to satisfactory protection of the lipid material in the final dried product. The experiments were performed using tallow, palm-oil and soya-bean oil containing varying proportions of free-fatty acids derived from the same lipid material.

The experimental procedure involved heating 100 grams of natural slaughter-house blood (18.7% dry matter) to a temperature in the range 40°–45° C., and mixing with 28 grams of lipid material previously heated to 70° C. The mixture was emulsified for 5 minutes using a Silverson homogeniser, and then allowed to cool and the gel formation assessed after ten minutes. The samples were then dried in an oven to give a product containing approximately 60% lipid material on a dry matter basis. The observations on gel formation are set out in Table 1 below.

TABLE 1

| Lipid | % FFA in lipid material | | | | |
|---|---|---|---|---|---|
| | 0 | 25 | 50 | 75 | 100 |
| Tallow | — | +++ | +++++ | +++++ | +++++ |
| Palm oil | — | +++ | +++++ | +++++ | +++++ |
| Soyabean oil | — | +++ | +++++ | +++++ | +++++ |

+++++ = very firm gel
+++ = adequate gel
— = no gel

The firmly-gelled products formed with lipid materials containing 50% free-fatty acids and more, were all very suitable for drying and gave dehydrated products in which the lipid material was very effectively protected. No leakage of lipid material from these dehydrated product was observed. The gelled products containing 25% free-fatty acids exhibited some leakage of lipid during drying, but still gave dehydrated products exhibiting a useful degree of lipid encapsulation. The blood-lipid emulsions containing no added free-fatty acids did not gel, and on dehydration produced products in which the lipid material was effectively completely free and unprotected.

EXAMPLE 3

A similar set of experiments to those described in Example 2, using the same basic procedure, were conducted to determine whether the addition of minor amount of alkali (caustic soda) to blood would contribute to the gelling action caused by the presence of free-fatty acids in the lipid material. The lipid material used was palm oil containing various proportions of palm acid oil in quantities sufficient to give the percentages of free-fatty acid indicated in the Table 2, which sets out the results.

TABLE 2

|  | % FFA in the lipid material | | | | | |
| --- | --- | --- | --- | --- | --- | --- |
|  | 10 | 15 | 20 | 25 | 30 | 65 |
| Blood, pH 7.4 (no added alkali) | — | — | — | +++ | ++++ | +++++ |
| Blood, pH 8.4 | — | — | — | +++ | +++ | +++++ |
| Blood, pH 9.0 | — | — | — | +++ | +++ | +++++ |

+++++ = very firm gel
+++ = adequate gel
— = no gel

It can be seen that the incorporation of minor amounts of alkali made no practical difference to the gelling properties of the blood-lipid emulsion.

A similar set of experiments was performed to determine whether the addition of mineral acid (hydrochloric acid) to the blood would influence the gelling properties of the blood-lipid emulsions. In this instance it was observed that altering the pH of the blood to 6.0 and 5.0 tended to inhibit gel formation in the emulsion, and clearly in the context of the present invention the addition of small quantities of mineral acid to the blood prior to mixing with the lipid material can not be recommended. When a greater quantity of hydrochloric acid was added to the blood, sufficient to reduce the pH to 4.0, the blood gelled very rapidly and in a practical commercial process it would be difficult to control this gelatin and produce a satisfactory product with consistent encapsulation of the lipid material.

EXAMPLE 4

This Example describes the result of a dairy cow trial set up to examine the effects of including a protected lipid material, made according to Example 1, in a standard commercial high-energy concentrate diet on the yield and quality of milk. The experimental diet was compared with one of similar specification but which included the same type and level of lipid in the free (i.e. unprotected) form.

Twelve multiparous cows in the 6th to 18th weeks of lactation were paired according to stage of lactation and milk yield in their previous lactation. Animals within each pair were randomly allocated to either the control or experimental diet. The design was a modified switch-back in which one of the pair completed three control periods each of 28 days. The second cow was fed in the order: control-experimental control, in 28-day periods.

The protected lipid material had the following composition:
Moisture: 3.0%
Oil: 56.2%
Protein: 37.9%
Ash: 2.9%

The product was of granular form and was incorporated directly into the diet.

Milk yields were recorded weekly. In the final two weeks of each 28-day period, two samples were taken per week. These were analysed for total solids, butter-fat content and protein.

Total milk yields were 28.54 and 29.57 kg per day for the control and experimental diets respectively, and this difference was significant. There was no significant difference in butter-fat content or protein content of the milk. As Table 3 below indicates, the energy and protein intakes of the cows receiving the control diet and experimental diet were effectively identical.

TABLE 3

|  | Control | Experimental |
| --- | --- | --- |
| Energy intake (MJ/day) | 206.6 | 201.8 |
| Protein intake (gm/day) | 2950 | 2920 |
| Milk yield (Kg/day) | 28.54 | 29.57 |
| Butterfat (%) | 3.10 | 3.15 |
| Total milk solids | 11.84 | 11.72 |
| Milk protein (%) | 3.15 | 3.12 |

I claim:

1. A process for the encapsulation of lipid material within a protective dehydrated proteinaceous matrix for use as an animal feedstuff ingredient, which process consists essentially of the steps of:
   (a) homogenizing undenatured slaughterhouse blood, essentially free from any anti-coagulating agents, with lipid material in the molten state containing by weight more than 20% free fatty acids;
   (b) allowing the resulting dispersion or emulsion to set to a firm gel prior to dehydration; and
   (c) drying said firm gel.

2. A process according to claim 1, in which said firm gel is dried in equipment in which said firm gel experiences a tumbling action.

3. A process for the encapsulation of lipid material within a protective dehydrated proteinaceous matrix for use as an animal feedstuff ingredient, which process consists essentially of the steps of:
   (a) dispersing or emulsifying a lipid material in an aqueous proteinaceous suspension containing, by weight of said suspension, at least 10% undenatured protein expressed on a dry weight basis, said lipid material being in the molten state and containing a proportion of free fatty acids sufficient to cause the resulting dispersion or emulsion to set a firm gel at a temperature of 50° C. or less;
   (b) allowing said gel formation to occur prior to dehydration; and
   (c) drying said firm gel.

4. A process according to claim 3, wherein said lipid material contains by weight at least 20% free fatty acids.

5. A process according to claim 3, wherein said lipid material contains by weight at least 30% free fatty acids.

6. A process according to claim 3, wherein said lipid material contains by weight at least 50% free fatty acids.

7. A process according to claim 3, wherein said lipid material includes lipid material selected from the group consisting of palm fatty acid oil, palm fatty acid distillate and fish acid oil.

8. A process according to claim 3, wherein said aqueous suspension of protein is natural slaughterhouse blood, essentially free from any anti-coagulating agents.

9. A process according to claim 3, wherein said firm gel is dried in equipment in which said firm gel experiences a tumbling action.

10. A process according to claim 1, claim 2 or claim 3, wherein one or more lipid-soluble feed additives are incorporated in said lipid material prior to the formation of said dispersion or emulsion.

* * * * *